US012711000B1

(12) United States Patent
Tak et al.

(10) Patent No.: US 12,711,000 B1
(45) Date of Patent: Aug. 18, 2026

(54) METHODS, SYSTEMS, AND COMPUTER READABLE MEDIA FOR LOCALLY STORING CLOUD APPLICATION USER PREFERENCES

(71) Applicant: Keysight Technologies, Inc., Santa Rosa, CA (US)

(72) Inventors: Gomedh Tak, New Delhi (IN); Kshitiz Gupta, Delhi (IN)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 493 days.

(21) Appl. No.: 18/227,484

(22) Filed: Jul. 28, 2023

(51) Int. Cl.
*G06F 9/54* (2006.01)
*H04L 67/306* (2022.01)

(52) U.S. Cl.
CPC ............ *G06F 9/541* (2013.01); *H04L 67/306* (2013.01); *G06F 9/547* (2013.01)

(58) Field of Classification Search
CPC ......... G06F 9/541; G06F 9/547; H04L 67/306
See application file for complete search history.

(56) References Cited

U.S. PATENT DOCUMENTS 8,725,793 B2 5/2014 Kroeger et al.
9,524,092 B2 12/2016 Ren et al.
10,169,555 B2 1/2019 Tseng et al.
10,218,505 B1 2/2019 Wright et al.
11,088,916 B1 * 8/2021 Chandrashekhar ..... H04L 41/40
11,734,032 B1 * 8/2023 Brinkhoff ............. G06F 3/0481 715/204
2004/0015476 A1 * 1/2004 Twaddle ............... G06F 16/972
2009/0106266 A1 * 4/2009 Donatelli .............. H04L 67/306
2009/0222302 A1 * 9/2009 Higgins ................. G06Q 30/02 705/14.16
2012/0102486 A1 * 4/2012 Yendluri .............. G06F 9/5072 717/176
2014/0280573 A1 * 9/2014 Bhakar .................. G06F 9/445 709/204

(Continued)

FOREIGN PATENT DOCUMENTS

WO 0171525 A1 9/2001
WO 2001071525 A1 9/2001

OTHER PUBLICATIONS

"External Repository for Configuration Files in Network Test Device Web-UI", IP.com Pub Id. IPCOM000272128D (May 2023).

*Primary Examiner* — Oleg Survillo

(57) ABSTRACT

Methods, systems, and computer readable media for locally storing cloud application user preferences are disclosed. One example method comprising: at a user device comprising at least one processor: obtaining, using a first representational state transfer (REST) application programming interface (API) endpoint and a local data store for storing user preference data associated with a first user of a user preferences service, user preference data for a first cloud application, wherein obtaining the user preference data includes obtaining, from a remote server, a default value for a first user preference of the user preference data when the local data store lacks a value for the first user preference; utilizing the user preference data to configure or present the first cloud application on the user device; detecting an updated value for the first user preference; and storing, in the local data store, the updated value for the first user preference.

20 Claims, 6 Drawing Sheets

(56) References Cited

U.S. PATENT DOCUMENTS

| | | | | |
|---|---|---|---|---|
| 2015/0244834 | A1* | 8/2015 | Zuo | H04L 67/5682<br>709/206 |
| 2017/0288982 | A1* | 10/2017 | Katsaros | H04L 67/02 |
| 2018/0109433 | A1* | 4/2018 | Nagaraj | H04L 43/12 |
| 2020/0050695 | A1* | 2/2020 | Benjamin | G06F 16/9535 |
| 2021/0288881 | A1* | 9/2021 | Zhang | H04L 47/825 |
| 2022/0279473 | A1* | 9/2022 | Meganathan | H04W 4/50 |
| 2023/0000352 | A1* | 1/2023 | Mitra | G16H 80/00 |

* cited by examiner

200

```
▼0: {id: 49, key: "theme", value: "dark-theme", userId: "a48a4df0-4f65-43a7-b41f-0bd51f73d135"}
    id: 49
    key: "theme"
    userId: "a48a4df0-4f65-43a7-b41f-0bd51f73d135"
    value: "dark-theme"
▼1: {id: 62, key: "pageSize", value: "25", userId: "a48a4df0-4f65-43a7-b41f-0bd51f73d135"}
    id: 62
    key: "pageSize"
    userId: "a48a4df0-4f65-43a7-b41f-0bd51f73d135"
    value: "25"
▼2: {id: 47, key: "viewType", value: "grid", userId: "a48a4df0-4f65-43a7-b41f-0bd51f73d135"}
    id: 47
    key: "viewtype"
    userId: "a48a4df0-4f65-43a7-b41f-0bd51f73d135"
    value: "grid"
```

Figure 3:
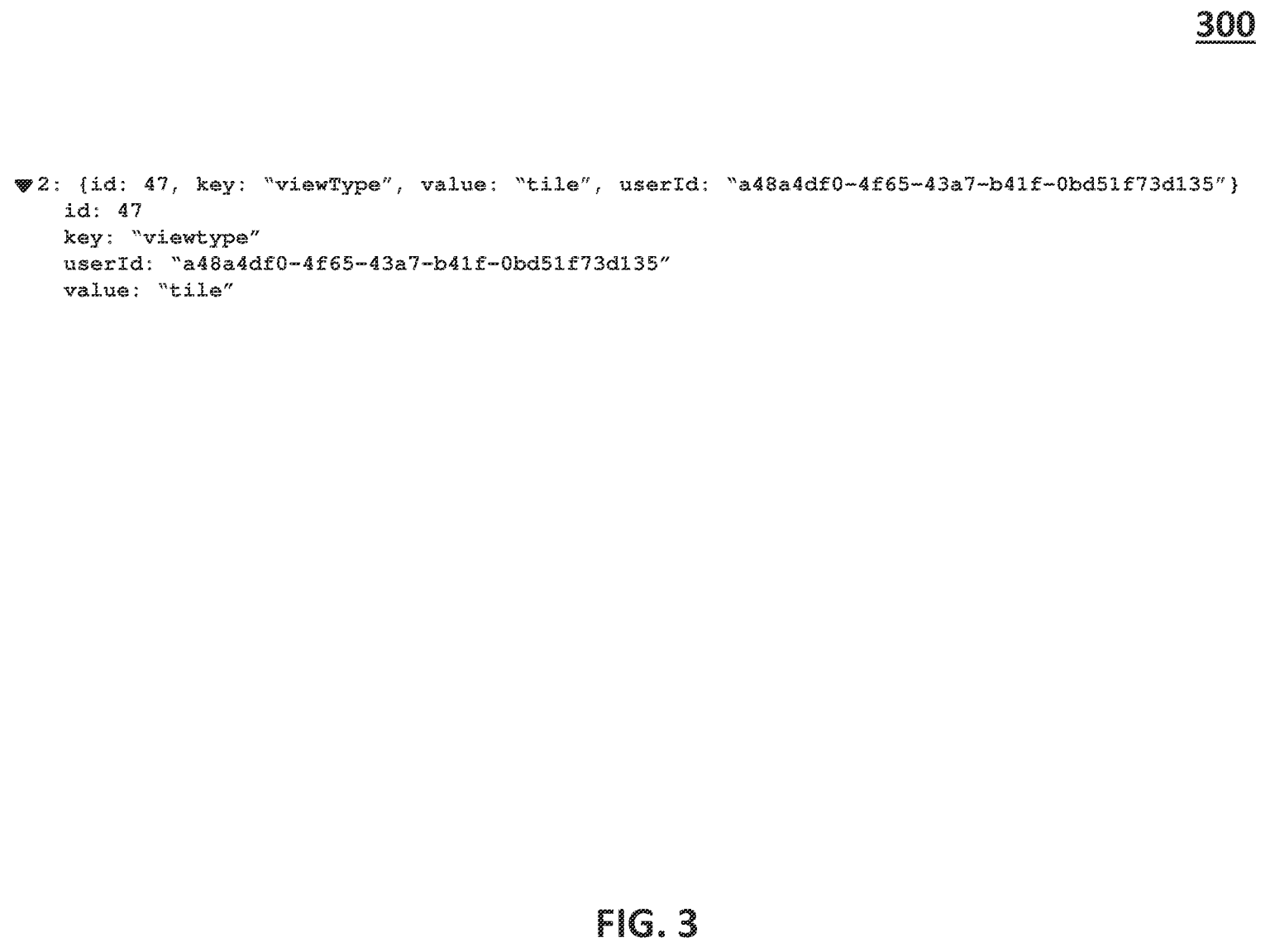

▼2: {id: 47, key: "viewType", value: "tile", userId: "a48a4df0-4f65-43a7-b41f-0bd51f73d135"}
id: 47
key: "viewtype"
userId: "a48a4df0-4f65-43a7-b41f-0bd51f73d135"
value: "tile"

```
▼0: {id: 49, key: "theme", value: "light-theme", userId: "a48a4df0-4f65-43a7-b41f-0bd51f73d135"}
    id: 49
    key: "theme"
    userId: "a48a4df0-4f65-43a7-b41f-0bd51f73d135"
    value: "light-theme"
```

FIG. 4

METHODS, SYSTEMS, AND COMPUTER READABLE MEDIA FOR LOCALLY STORING CLOUD APPLICATION USER PREFERENCES

TECHNICAL FIELD

The subject matter described herein relates to network communications. More specifically, the subject matter relates to methods, systems, and computer readable media for locally storing cloud application user preferences.

BACKGROUND

Cloud applications (also referred to as cloud apps) are becoming increasingly important. While cloud-based applications can offer various benefits like accessibility and scalability, relying solely on cloud storage for user preferences can introduce potential challenges, including responsiveness or latency issues and reliance on consistent network connectivity. By storing user preferences locally, cloud apps can enhance the user experience by providing access to personalized settings, even in scenarios where internet or network connectivity may be limited or disrupted. For example, local storage of user preferences allows users to maintain their preferred configurations, such as layout preferences, without relying on an internet connection. While some existing mechanisms may be used to store cloud app user preferences locally, these mechanisms can have significant disadvantages. For example, cookie based mechanisms generally require user consent and may not maintain user preferences for a long time (e.g., because cookie based or browser based settings don't allow persistent storage). In another example, third-party (e.g., non-native) mechanisms may lack granularity, management features, and/or require licenses. In another example, lack of scalability may be an issue (e.g., the amount of overhead of conventional mechanisms may be significant). By combining cloud computing with local storage for user preferences, cloud apps can offer a robust and customizable experience in various environments.

SUMMARY

Methods, systems, and computer readable media for locally storing cloud application user preferences are disclosed. One example method comprising: at a user device comprising at least one processor: obtaining, using a first representational state transfer (REST) application programming interface (API) endpoint and a local data store for storing user preference data associated with a first user of a user preferences service, user preference data for a first cloud application, wherein obtaining the user preference data includes obtaining, from a remote server, a default value for a first user preference of the user preference data when the local data store lacks a value for the first user preference; utilizing the user preference data to configure or present the first cloud application on the user device; detecting an updated value for the first user preference; and storing, in the local data store, the updated value for the first user preference.

According to one example system for locally storing cloud application user preferences, the system comprises a memory, at least one processor, and a user device implemented using the memory and the at least one processor. The user device is configured for: obtaining, using a first REST API endpoint and a local data store for storing user preference data associated with a first user of a user preferences service, user preference data for a first cloud application, wherein obtaining the user preference data includes obtaining, from a remote server, a default value for a first user preference of the user preference data when the local data store lacks a value for the first user preference; utilizing the user preference data to configure or present the first cloud application on the user device; detecting an updated value for the first user preference; and storing, in the local data store, the updated value for the first user preference.

The subject matter described herein may be implemented in software in combination with hardware and/or firmware. For example, the subject matter described herein may be implemented in software executed by a processor (e.g., a hardware-based processor). In one example implementation, the subject matter described herein may be implemented using a non-transitory computer readable medium having stored thereon computer executable instructions that when executed by the processor of a computer control the computer to perform steps. Example computer readable media suitable for implementing the subject matter described herein include non-transitory devices, such as disk memory devices, chip memory devices, programmable logic devices, such as field programmable gate arrays, and application specific integrated circuits. In addition, a computer readable medium that implements the subject matter described herein may be located on a single device or computing platform or may be distributed across multiple devices or computing platforms.

As used herein, the term "node" refers to at least one physical computing platform including one or more processors and memory.

As used herein, the term "cloud application" or "cloud app" may refer to an application that provides or interacts with data or services via the internet, a network, or the web. For example, a cloud app may require that a user device has internet connectivity for at least some functionality or features to work, but may provide other features offline or without network connectivity.

As used herein, the terms "function" and "module" refer to software in combination with hardware and/or firmware for implementing features described herein. In some embodiments, a module may include a field-programmable gateway array (FPGA), an application-specific integrated circuit (ASIC), or a processor.

BRIEF DESCRIPTION OF THE DRAWINGS

The subject matter described herein will now be explained with reference to the accompanying drawings of which:

FIG. 2 is a diagram illustrating example code for defining user preferences;

FIG. 3 is a diagram illustrating example code for defining an updated user preference regarding a viewType attribute of a cloud application;

FIG. 4 is a diagram illustrating example code for defining an updated user preference regarding a theme attribute of a cloud application;

DETAILED DESCRIPTION

Figure 1:
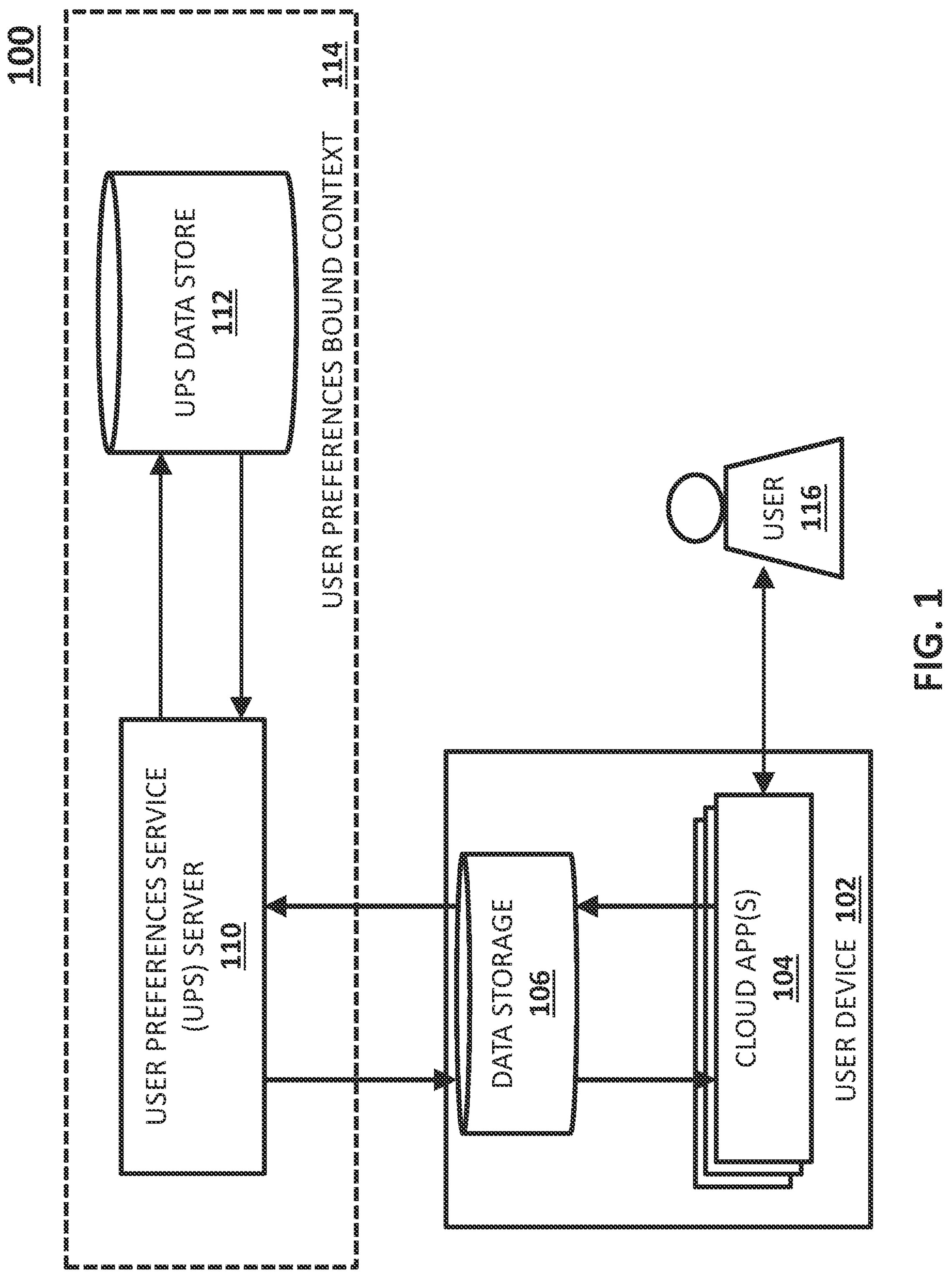
FIG. 1 is a diagram illustrating an example environment for locally storing cloud application user preferences.

The subject matter described herein relates to methods, systems, and computer readable media for locally storing cloud application user preferences. While cloud-based applications, also referred to here as cloud apps, offer numerous benefits like accessibility and scalability, relying solely on cloud storage for user preferences can introduce potential challenges. While some existing mechanisms may be used to store cloud app user preferences locally, these mechanisms have disadvantages, e.g., third-party reliance, lack of persistency, and/or lack of scalability. In particular, there is a need for an efficient, scalable mechanism and/or system for storing user preference data locally and for a long time, e.g., until a user changes their user preferences explicitly.

In accordance with some aspects of the subject matter described herein, techniques, methods, equipment, systems, and/or mechanisms are disclosed for locally storing cloud application user preferences. For example, a user device or a cloud app executing thereon in accordance with aspects described herein may utilize a novel approach to store and retrieve user preferences or related data associated with cloud apps. In this example, the approach may involve a microservice based mechanism (e.g., a microservice application running on a server separate from a cloud app server or the user device) for storing and receiving user preference data and usable by multiple cloud apps having common or related user preferences, e.g., applications from a same software vendor. In some embodiments, a microservice based mechanism may expose multiple API endpoints, e.g., one API endpoint usable by a cloud app or a user device for obtaining stored user preferences and another API endpoint usable by a cloud app or a user device for updating user preferences (e.g., when changes occur). For example, a stored or saved user preference may be non-volatile and is not modified until a corresponding user updates or changes the value of the user preference.

Aspects of the subject matter described herein provides various benefits or advantages over conventional user preferences handling mechanisms. For example, advantages for a microservice based approach in accordance with some aspects described herein include an independent or self-contained approach for storing and retrieving user preferences without using any third party tools; an improved user experience by providing a consistent approach for storing and retrieving user preferences across multiple cloud apps; increased scalability and availability from using a microservice architecture; and/or improved app performance under poor network conditions (e.g., a network with low speeds, high latency, or low bandwidth) by reducing the need to request user preferences or related data from a remote server.

Reference will now be made in detail to exemplary embodiments of the subject matter described herein, examples of which are illustrated in the accompanying drawings. Wherever possible, the same reference numbers will be used throughout the drawings to refer to the same or like parts.

FIG. 1 is a diagram illustrating example environment 100 for locally storing cloud application user preferences. Referring to FIG. 1, environment 100 may include a user device 102 and a user preferences service (UPS) server 110. Environment 100 may represent various nodes or devices and may include one or more networks, such as an internal network, a cloud environment, and/or the internet.

User device 102 may represent a suitable entity (e.g., a computer, a tablet device, a smartphone, etc.) for executing cloud app(s) 104 and allowing user 116 to interact with cloud app(s) 104 and/or other entities, e.g., UPS server 110, a UPS data store 112, an authentication server, network-connected devices, test stations, test instruments, etc. In some embodiments, user device 102 may include hardware and firmware, such as one or more processor(s) (e.g., a physical processor, a virtual processor, a graphics processing unit (GPU), or a central processing unit (CPU) and memory or storage, e.g., data storage 106. For example, user device 102 may include data storage 106 for storing logic or other data and processor(s) 103 for executing one or more cloud app(s) 104.

Data storage 106 may be any suitable entity or entities (e.g., a storage device, a memory, a non-transitory computer readable medium, or a storage system) for maintaining or storing applications, user preferences, or other data. For example, data storage 106 may store user preferences (e.g., settings) usable for presenting or configuring cloud app(s) 104 at user device 102. In this example, data storage 106 may store user preferences locally (e.g., relative to user device 102) and persistently, thereby reducing or eliminating the need to request and receive user preferences from a remote server, e.g., at application login or startup. In some embodiments, data storage 106 may be located at one node or platform or distributed across multiple platforms or devices.

Cloud app(s) 104 may represent one or more applications or programs that provides or interacts with data or services via the internet, a network, or the web. For example, cloud app 104 may represents a program or application that manages or interacts with various network-connected devices, e.g., internet of things (IoT) devices, test devices, test stations, etc. In this example, cloud app 104 may require internet connectivity for at least some aspects or features to work.

UPS server 110 may represent a suitable entity or entities (e.g., a physical server, a virtual server, or a virtual machine (VM) running on a physical platform) for interacting with various entities, e.g., user device 102, cloud app(s) 104, UPS data store 112, etc. For example, UPS server 110 may be a UPS VM or virtual container running in a cloud based platform and may include logic for communicating with UPS-supported or UPS-aware entities and for storing and retrieving user preferences or related data from UPS data store 112.

UPS data store 112 may be any suitable entity or entities (e.g., a repository, a storage device, a memory, a non-transitory computer readable medium, or a storage system) for maintaining or storing information related to user preference data associated with cloud app(s) 104 and related users, e.g., user 116. For example, UPS data store 112 may store associations between users and user preference data. For example, UPS data store 112 may include or represent a data structure that stores user preferences (or related data) for each user and/or application. In this example, each set of user preferences may be indexed and/or retrieved using a user identifier, identifier, an application identifier, or other information. In some embodiments, UPS data store 112 may be located at one node or platform or distributed across multiple platforms or devices.

A user preferences bounded context 114 may represent a relationship between UPS server 110 and particular user preference data stored in UPS data store 112. For example, a first cloud app 104 may send a POST API request including a first user preference value along with a user identifier to UPS server 110, e.g., via a POST API endpoint or URI. In this example, UPS server 110 may use the user identifier (e.g., a key or lookup value) to store the first user preference value in UPS data store 112. Continuing with this example, the first cloud app 104 or a second cloud app 104 may send a GET API request including the user identifier to UPS server 110 (e.g., via a GET API endpoint or URI) to retrieve the stored user preferences associated with the user identifier (e.g., including the first user preference value).

In some embodiments, user device 102 and/or cloud app(s) 104 may include software or logic for utilizing services or microservices, such as a UPS client. For example, a UPS may allow UPS-supported or UPS-aware entities (e.g., UPS clients, cloud app(s) 104, user device 102, etc.) to store and retrieve user preferences associated with cloud app(s) 104. In some embodiments, user device 102 or cloud app(s) 104 may include logic for acting as a UPS client and may request, provide, and update user preferences via a UPS or a related server, e.g., UPS server 110. For example, a UPS may include or utilize UPS server 110 for receiving UPS related requests and sending UPS related responses and UPS data store for storing user preferences or data associated with one or more users, e.g., user 116.

In some embodiments, a UPS or related mechanism utilized by user device 102 and/or cloud app(s) 104 may be based on a microservice architecture and developed using TypeScript or another programming language. In such embodiments, a UPS client (e.g., user device 102, cloud app(s) 104, etc.) may communicate with UPS server 110 using two API endpoints (e.g., uniform resource locators (URLs) or uniform resource identifiers (URIs)), such as a GET API endpoint for data retrieval and a POST API endpoint for data storage.

In some embodiments, a GET API endpoint may be usable for retrieving default values or user-specific values of user preferences associated with cloud app(s) 104. For example, cloud app(s) 104 may send a hypertext transfer protocol (HTTP) GET request to a GET API endpoint (e.g., "server1.dmain.com/user-preferences/default" or "server1.dmain.com/user-preferences/{uid}") when the application boots up or after the user has successfully logged in to the application. In this example, an HTTP GET request may request default values (e.g., a default theme value) for cloud app(s) 104. In another example, cloud app(s) 104 may use a GET API endpoint comprising a user identifier "{uid}" identifying user 116 (e.g., "server1.dmain.com/user-preferences/{uid}") to obtain stored user preference values associated with user 116. In some embodiments, cloud app(s) 104 may obtain user preferences from data storage 106 if locally available or from UPS data store 112 if not locally available.

In some embodiments, a POST API endpoint may be usable for providing values of user preferences associated with cloud app(s) 104 for persistent storage (e.g., in UPS data store 112). For example, cloud app(s) 104 may send an HTTP POST request to a POST API endpoint (e.g., "server1.dmain.com/user-preferences/post/{uid}" or "server1.dmain.com/user-preferences/post/{uid}/{id}") when user 116 changes a user preference, such as a theme value, a view type value, or a page size value. In this example, an HTTP POST request may include user preference(s) or related data (e.g., in a key-value object of the message payload). In some embodiments, cloud app(s) 104 may store the changed or updated user preferences in data storage 106 (e.g., locally) before providing the user preferences to UPS server 110 (e.g., for storage in UPS data store 112).

In some embodiments, after updated user preference values associated with user 116 are stored in data storage 106, the next time user 116 logs into cloud app(s) 104 using user device 102, the stored user preferences will be obtained and utilized in lieu of requesting user preference data from a remote server (e.g., UPS server 110). As such, storing user preferences locally as discussed herein can improve user experience and increase application performance, e.g., by reducing wait time associated with GET API calls and responses from UPS server 110.

It will be appreciated that FIG. 1 is for illustrative purposes and that various nodes and/or modules, locations, and/or functionality described above in relation to FIG. 1 may be changed, altered, added, or removed. For example, data storage 106 or related entities may be located in a platform, device, or entity distinct and separate from user device 102. In another example, some functionality (e.g., a UPS client) of functionalities described above as performed by cloud app(s) 104 may be distinct and separate from other functionalities described above as performed by cloud app (s) 104.

FIG. 2 is a diagram illustrating example code 200 for defining user preferences. In some embodiments, code 200 or related data may be stored in UPS data store 112, data storage 106, or a memory accessible to user device 102. In some embodiments, code 200 or related data may be obtained or received during or after an application login phase (e.g., successful user authentication) of cloud app(s) 104.

In some embodiments, e.g., after a successful authentication of user 116 with an authentication service associated with cloud app(s) 104, user device 102 or cloud app(s) 104 (e.g., via a related API) may request user preferences from UPS server 110 by sending a GET request to a REST API endpoint associated with UPS server 110. In this example, the GET request may include or indicate a user ID for uniquely identifying user 116. Continuing with this example, server 110 may respond with a 200 OK message or another message having a message body or payload comprising code 200, e.g., a set of user preferences associated with user 116.

In some embodiments, code 200 may represent one or more object structure(s) (e.g., Javascript Object Notation (JSON) objects) used in a response to a GET API request or call during a user login procedure or "user-login" service, e.g., when logging into or after successfully logging into cloud app(s) 104. For example, code 200 may include or indicate each user preference as an object containing key-value pairs, also referred to as properties. In this example, the objects may be formatted or provided in a JSON format or using a JavaScript or TypeScript programming language. In some embodiments, user preference data may be related to different attributes or settings of cloud app(s) 104, such as a theme, a page size (e.g., a pagination size), or a view type.

In some embodiments, code 200 or related data may be preloaded or may be received from server 110 or another entity (e.g., a network operator). In some embodiments, code 300 or related data may be preloaded or may be received from server 110 or another entity (e.g., a network operator), e.g., in response to a successful app login or stored from a prior successful login.

Referring to FIG. 2, code 200 may use JSON or another data format to define three user preferences as objects comprising key-value pairs. For example, each user preference object may include an 'id', 'key', 'value', and 'userid' field or property.

As depicted, code 200 includes a first object "0" representing a user preference for cloud app(s) 104 and includes an 'id' property of 49 (e.g., representing a unique identifier identifying a "theme" user preference); a 'key' property of "theme" (e.g., representing a human-friendly name of this user preference); a 'value' field of "dark-theme" (e.g., representing a name or identifier indicating a dark color theme to use) and a 'userid' field of "a48a4df0-4f65-43a7-b41f-

0bd51f73d135" (e.g., representing a unique identifier for the user associated with this user preference). Code 200 also includes a second object "1" representing another user preference for cloud app(s) 104 and includes an 'id' property of 62 (e.g., representing a unique identifier identifying a "pageSize" user preference); a 'key' property of "pageSize" (e.g., representing a human-friendly name of this user preference); a 'value' field of "25" (e.g., representing a number of items to display per page) and a 'userId' field of "a48a4df0-4f65-43a7-b41f-0bd51f73d135" (e.g., representing a unique identifier for the user associated with this user preference). Code 200 also includes a third object "2" representing another user preference for cloud app(s) 104 and includes an 'id' property of 47 (e.g., representing a unique identifier identifying a "viewType" user preference); a 'key' property of "viewType" (e.g., representing a human-friendly name of this user preference); a 'value' field of "grid" (e.g., representing a grid-based view to display items or data) and a 'userId' field of "a48a4df0-4165-43a7-b41f-0bd51f73d135" (e.g., representing a unique identifier for the user associated with this user preference).

It will be appreciated that code 200 in FIG. 2 is for illustrative purposes and that different and/or additional code or data may be provided or requested for defining user preferences associated with cloud app(s) 104. Further, it will be appreciated that logic, data, or user preferences defined in code 200 may be expressed in various programming languages or data formats.

FIG. 3 is a diagram illustrating example code 300 for defining an updated user preference regarding a viewType attribute of cloud app(s) 104. In some embodiments, code 300 or related data may be stored in UPS data store 112, data storage 106, or a memory accessible to user device 102. In some embodiments, code 300 or related data may be sent or provided by user device 102 or cloud app(s) 104 after a user preference associated with cloud app(s) 104 is selected, updated, or changed, e.g., by user 116 interacting with a GUI of cloud app(s) 104.

In some embodiments, e.g., after user 116 changes a user preference (e.g., an app setting) in cloud app(s) 104, user device 102 or cloud app(s) 104 (e.g., via a related UI) may provide the updated user preference to UPS server 110 by sending a POST request to a REST endpoint associated with UPS server 110. In this example, the POST request may include a message body or payload comprising code 300, e.g., a set of key-value pairs representing the updated user preference.

In some embodiments, code 300 may represent an object structure (e.g., a JSON object) of a POST API request or call during a user preference(s) update procedure or "user-preference" service, e.g., when one or more user preferences associated with cloud app(s) 104 are changed, e.g., by user 116. For example, code 300 may include or indicate a user preference as an object containing key-value pairs. In this example, the object may be formatted or provided in a JSON format or using a JavaScript or TypeScript programming language.

Referring to FIG. 3, code 300 may use JSON or another data format to define a recently changed or updated user preference related to a viewType attribute or setting associated with cloud app(s) 104. As depicted, code 300 indicates an 'id' property of 47 (e.g., representing a unique identifier identifying the "viewType" user preference); a 'key' property of "viewType" (e.g., representing a human-friendly name of this user preference); a 'value' field of "tile" (e.g., representing a tile-based view to display items or data) and a 'userId' field of "a48a4df0-4f65-43a7-b41f-0bd51f73d135" (e.g., representing a unique identifier for the user associated with this user preference).

It will be appreciated that code 300 in FIG. 3 is for illustrative purposes and that different and/or additional code may be sent or provided when a user preference is updated or changed. Further, it will be appreciated that logic, data, or a user preference defined in code 300 may be expressed in various programming languages or data formats.

FIG. 4 is a diagram illustrating example code 400 defining an updated user preference regarding a theme attribute of cloud app(s) 104. In some embodiments, code 400 or related data may be stored in UPS data store 112, data storage 106, or a memory accessible to user device 102. In some embodiments, code 400 or related data may be sent or provided by user device 102 or cloud app(s) 104 after a user preference associated with cloud app(s) 104 is selected, updated, or changed, e.g., by user 116 interacting with a GUI of cloud app(s) 104.

In some embodiments, e.g., after user 116 changes a user preference (e.g., an app setting) in cloud app(s) 104, user device 102 or cloud app(s) 104 (e.g., via a related API) may provide the updated user preference to UPS server 110 by sending a POST request to a REST endpoint associated with UPS server 110. In this example, the POST request may include a message body or payload comprising code 400, e.g., a set of key-value pairs representing the updated user preference.

In some embodiments, code 400 may represent an object structure (e.g., a JSON object) of a POST API request or call during a user preference(s) update procedure or "user-preference" service, e.g., when one or more user preferences associated with cloud app(s) 104 are changed, e.g., by user 116. For example, code 400 may include or indicate a user preference as an object containing key-value pairs. In this example, the object may be formatted or provided in a JSON format or using a JavaScript or TypeScript programming language.

Referring to FIG. 4, code 400 may use JSON or another data format to define a recently changed or updated user preference related to a theme attribute or setting associated with cloud app(s) 104. As depicted, code 400 indicates an 'id' property of 49 (e.g., representing a unique identifier identifying the "theme" user preference); a 'key' property of "theme" (e.g., representing a human-friendly name of this user preference); a 'value' field of "light-theme" (e.g., representing a name or identifier indicating a dark color theme to use) and a 'userId' field of "a48a4df0-4f65-43a7-b41f-0bd51f73d135" (e.g., representing a unique identifier for the user associated with this user preference).

It will be appreciated that code 400 in FIG. 4 is for illustrative purposes and that different and/or additional code may be sent or provided when a user preference is updated or changed. Further, it will be appreciated that logic, data, or a user preference defined in code 400 may be expressed in various programming languages or data formats.

Figure 5:
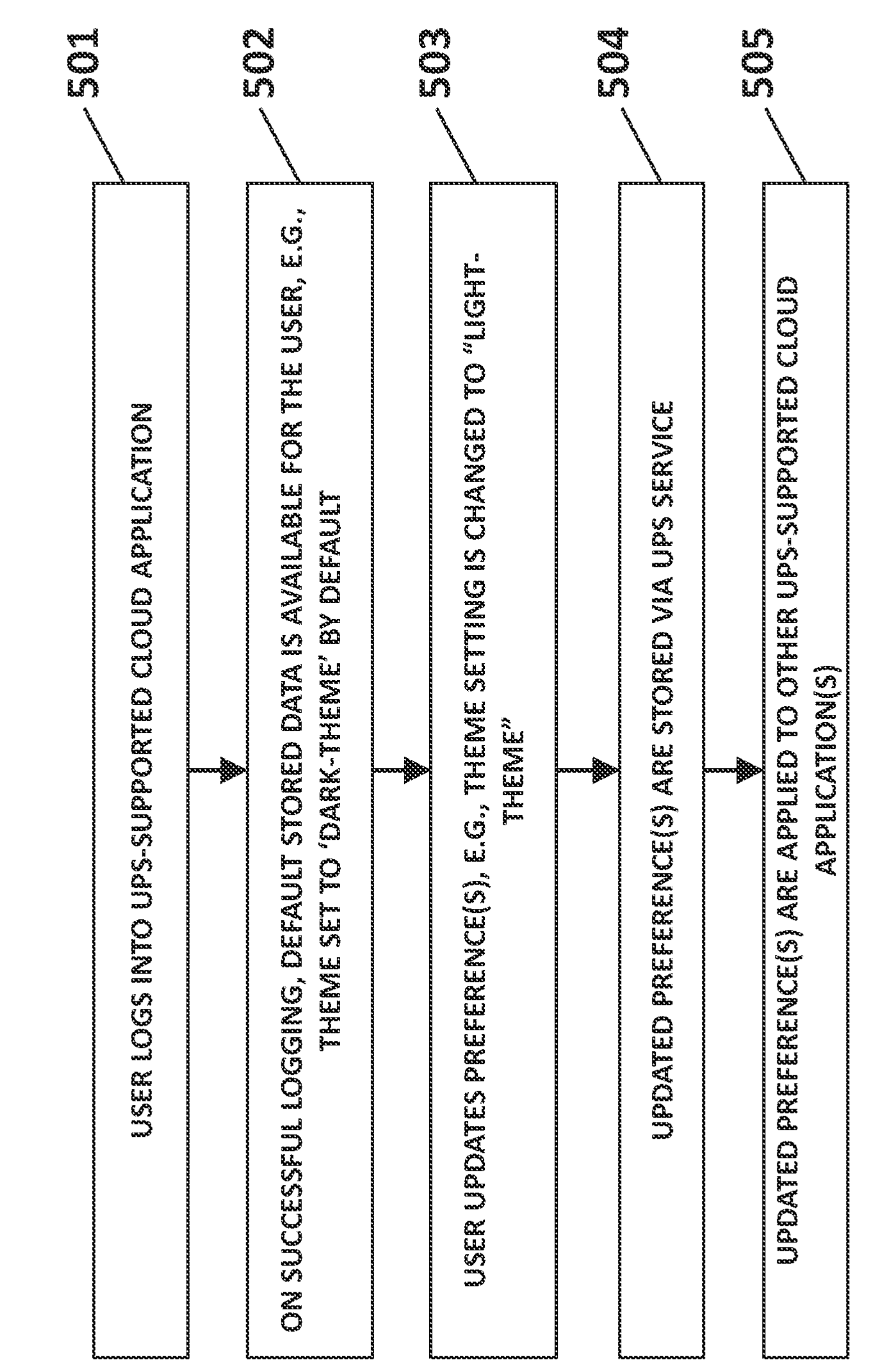
FIG. 5 is a diagram illustrating an example process for updating cloud application user preferences.

FIG. 5 is a diagram illustrating an example process 500 for updating cloud application user preferences. In some embodiments, process 500 may utilize a UPS microservice and UPS-supported entities (e.g., cloud app(s) 104 or UPS server 110) for storing and retrieving user preferences associated with cloud app(s) 104.

Referring to process 500, in step 501, user 116 (e.g., via a UI running on user device 102) may log into cloud app 104, e.g., a test station management application. For example, during an cloud application login procedure, user device 102 or another entity may send user credentials to an authentication server (e.g., via an authentication service) to obtain authorization prior to showing authorized or privileged data in cloud app 104.

In step 502, e.g., after a successful user login, default stored user preference data may be available for user 116. For example, after successful login, previously stored user preferences (e.g., a default theme user preference of "dark-theme") may be retrieved from local storage (e.g., data storage 106) and used in displaying cloud app(s) 104 (e.g., a plurality of related but different applications) or portions thereof (e.g., pages) on user device 102.

In step 503, e.g., while user 116 is interacting with cloud app(s) 104, user 116 (e.g., via a UI running on user device 102) may change a user preference or setting associated with cloud app(s) 104. For example, user 116 may change an application theme setting from "dark-theme" to "light-theme" via a selection menu provided by cloud app 104.

In step 504, cloud app(s) 104 may store or save updated user preference(s) (e.g., a theme user preference of "light-theme" from "dark-theme") in data storage 106 and (e.g., acting as a UPS client) may also send a POST request indicating the updated user preference to UPS server 110, where UPS server 110 may store the updated user preference in UPS data store 112. For example, cloud app(s) 104 may communicate with UPS server 110 via a POST API endpoint at various times, e.g., by periodically providing updated user preferences or when a user preference is changed.

In step 505, an updated or changed preference may be applied or available for use by other cloud app(s) 104. For example, after a user preference is updated and when a user logs into a second cloud app 104 (either via user device 102 or another device), the user preference may be obtained by the second cloud app 104 and used in presenting or configuring the second cloud app 104. In another example, e.g., where UPS server 110 provides updated user preferences dynamically or periodically to relevant cloud app(s) 104, each of cloud app(s) 104 may apply the updated user preferences at various times, e.g., during use or after the initial login procedure.

It will be appreciated that aspects and functions described in FIG. 5 are for illustrative purposes and that different and/or additional aspects and functions may be utilized when updating or saving cloud application user preferences.

Figure 6:
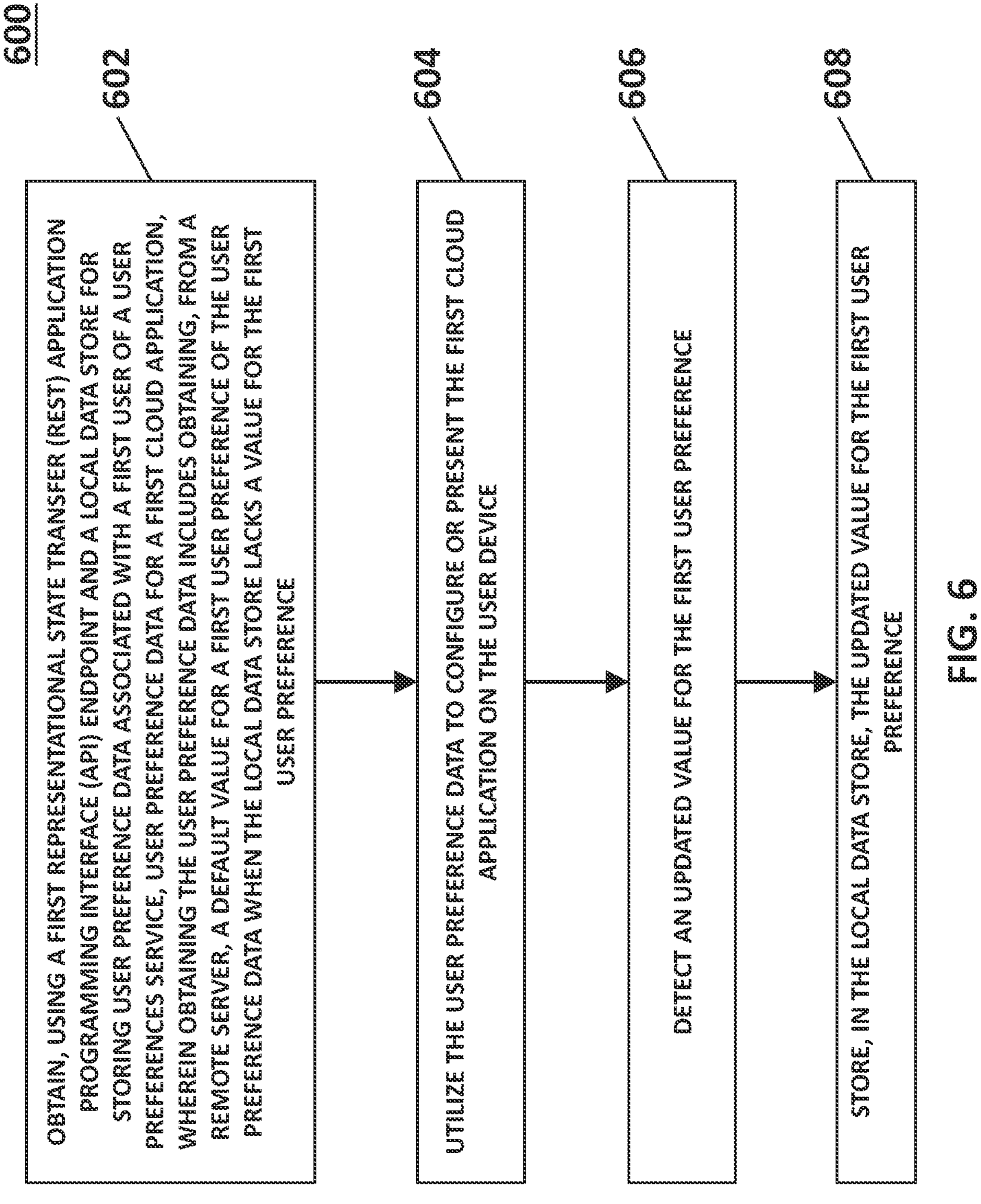
FIG. 6 is a block diagram illustrating an example process for locally storing cloud application user preferences.

FIG. 6 is a block diagram illustrating an example process 600 for locally storing cloud application user preferences. In some embodiments, process 600 may include steps 602, 604, 606, and/or 608. In some embodiments, process 600, or portions thereof, may be performed by user device 102, cloud app(s) 104, and/or another node or module.

Referring to FIG. 6, in step 602, user preference data for a first cloud application may be obtained using a first REST API endpoint (e.g., a GET API endpoint) and a local data store (e.g., data storage 106) for storing user preference data associated with a UPS. In some embodiments, obtaining user preference data may include obtaining, from a remote server (e.g., UPS server 110 or UPS data store 112), a default value for a first user preference of the user preference data when the local data store lacks a value for the first user preference.

In some embodiments, obtaining user preference data may occur concurrently with or after starting or logging into a first cloud application.

In some embodiments, obtaining user preference data may include sending, using a first REST API endpoint (e.g., a GET API endpoint), a GET API message for requesting at least some of the user preference data and receiving a GET API response message providing at least some of the user preference data in a data format discernible by a user device (e.g., user device 116).

In step 604, the user preference data may be utilized to configure or present the first cloud application on the user device. For example, user preference data may include a theme setting, a page size setting, and/or a view type setting for cloud app(s) 104. In this example, when loading cloud app(s) 104 or related pages, cloud app(s) 104 may use these settings when displaying a GUI or pages associated with cloud app(s) 104.

In step 606, an updated value for the first user preference may be detected. For example, user 116 may adjust user preferences or settings by selecting or changing values on an app configuration page of cloud app(s) 104.

In step 608, the updated value for the first user preference may be stored in the local data store. For example, after a user 116 changes a user preference, cloud app(s) 104 or a related entity may store this change or a representation thereof at data storage 106 for subsequent uses (e.g., when user 116 logs into a related, but different cloud application).

In some embodiments, e.g., after or concurrently with storing an updated value for a first user preference in a local data store, user device 102 or a local data store controller (e.g., cloud app(s) 104) may be configured for: sending, using a second REST API endpoint (e.g., a POST API endpoint) and to a remote server, a POST API message including the updated value for the first user preference and receiving, from the remote server, a POST API response indicating a successful update of the value of the first user preference.

In some embodiments, a POST API message may include a user identifier, an application identifier, or another identifier for uniquely identifying data associated with a user (e.g., user 116) stored at or by a remote server.

In some embodiments, in response to a second cloud application associated with a UPS starting up or being logged into by the user, values for compatible user preferences may be obtained from a local data store (e.g., data storage 106) in lieu of requesting the values for the compatible user preferences from a remote server (e.g., UPS server 110 or UPS data store 112).

In some embodiments, a data format for defining or storing user preference data may include a JSON format, an extensible markup language (XML) format, an object notation format, a data interchange format, or a binary format.

In some embodiments, a remote server may include a UPS platform (e.g., UPS server 110) or a remote data store (e.g., UPS data store 112) for storing user preference data for a plurality of cloud applications (e.g., cloud app(s) 104) including a first cloud application.

In some embodiments, a UPS platform (e.g., UPS server 110) may utilize a microservice architecture, e.g., a UPS with two exposed API endpoints.

In some embodiments, a UPS platform (e.g., UPS server 110) may be distinct from a cloud application server (e.g., a VM or web server) providing or server data to a first cloud application (e.g., cloud app(s) 104 executing on user device 102).

In some embodiments, a first user preference may include a theme preference, a page size preference, or a view type preference.

It will be appreciated that process 600 is for illustrative purposes and that different and/or additional actions may be used. It will also be appreciated that various actions described herein may occur in a different order or sequence.

It should be noted that user device 102, cloud app(s) 104, UPS server 110, and/or various modules, nodes, or functionality described herein may constitute a special purpose computing platform, device, or system. For example, user device 102, cloud app(s) 104, or UPS server 110 may be a network appliance or node configured to perform various aspects described herein. Further, user device 102, cloud app(s) 104, UPS server 110, or various functionality described herein can improve the technological field of network communications by providing various techniques, systems, methods, or mechanisms for locally storing cloud application user preferences, e.g., by providing an architecture (e.g., a microservice architecture) or related mechanisms for storage and retrieval of user preferences at various times, e.g., when needed or when changes occur.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for locally storing cloud application user preferences, the method comprising:

at a user device comprising at least one processor:

obtaining, using a first representational state transfer (REST) application programming interface (API) endpoint and a local data store for storing user preference data associated with a first user of a user preferences service, user preference data for a first cloud application, wherein obtaining the user preference data includes obtaining, from a remote server, a default value for a first user preference of the user preference data when the local data store lacks a value for the first user preference;

utilizing the user preference data to configure or present the first cloud application on the user device;

detecting an updated value for the first user preference; and storing, in the local data store, the updated value for the first user preference.

2. The method of claim 1 comprising:

at the user device or a local data store controller:

sending, using a second REST API endpoint and to the remote server, a POST API message including the updated value for the first user preference; and receiving, from the remote server, a POST API response indicating a successful update of the value of the first user preference.

3. The method of claim 2 wherein the POST API message includes a user identifier, an application identifier, or another identifier for uniquely identifying data associated with the first user stored at or by the remote server.

4. The method of claim 1 comprising:

in response to a second cloud application associated with the user preferences service starting up or being logged into by the first user, obtaining, from the local data store, values for compatible user preferences including the first user preference in lieu of requesting the values for the compatible user preferences from the remote server.

5. The method of claim 1 wherein obtaining the user preference data occurs concurrently with or after starting or logging into the first cloud application.

6. The method of claim 1 wherein obtaining the user preference data includes sending, using the first REST API endpoint, a GET API message for requesting at least some of the user preference data and receiving a GET API response message providing at least some of the user preference data in a data format discernible by the user device.

7. The method of claim 6 wherein the data format includes a Javascript Object Notation (JSON) format, an extensible markup language (XML) format, an object notation format, a data interchange format, or a binary format.

8. The method of claim 1 wherein the remote server includes a user preferences service platform or a remote data store for storing user preference data for a plurality of cloud applications including the first cloud application.

9. The method of claim 1 wherein the first user preference includes a theme preference, a page size preference, or a view type preference.

10. A system for locally storing cloud application user preferences, the system comprising:

a memory;

at least one processor; and a user device implemented using the memory and the at least one processor, the user device configured for:

obtaining, using a first representational state transfer (REST) application programming interface (API) endpoint and a local data store for storing user preference data associated with a first user of a user preferences service, user preference data for a first cloud application, wherein obtaining the user preference data includes obtaining, from a remote server, a default value for a first user preference of the user preference data when the local data store lacks a value for the first user preference;

utilizing the user preference data to configure or present the first cloud application on the user device;

detecting an updated value for the first user preference; and storing, in the local data store, the updated value for the first user preference.

11. The system of claim 10 wherein the user device or a local data store controller is configured for:

sending, using a second REST API endpoint and to the remote server, a POST API message the updated value for the first user preference; and receiving, from the remote server, a POST API response indicating a successful update.

12. The system of claim 11 wherein the POST API message includes a user identifier, an application identifier, or another identifier for uniquely identifying data associated with the first user that is stored at or by the remote server.

13. The system of claim 10 wherein the user device is configured for:

in response to a second cloud application associated with the user preferences service starting up or being logged into by the first user, obtaining, from the local data store, values for compatible user preferences including the first user preference in lieu of requesting the values for the compatible user preferences from the remote server.

14. The system of claim 10 wherein the user device is configured for obtaining the user preference data concurrently with or after starting or logging into the first cloud application.

15. The system of claim 10 wherein the user device is configured for sending, using the first REST API endpoint, a GET API message for requesting at least some of the user preference data and receiving a GET API response message providing at least some of the user preference data in a data format discernible by the user device.

16. The system of claim 15 wherein the data format includes a Javascript Object Notation (JSON) format, an extensible markup language (XML) format, an object notation format, a data interchange format, or a binary format.

17. The system of claim 10 wherein the remote server includes a user preferences service platform or a remote data store for storing user preference data for a plurality of cloud applications including the first cloud application.

18. The system of claim 17 wherein the user preferences service platform utilizes a microservice architecture or the user preferences service platform is distinct from a cloud application server providing data or service to the first cloud application.

19. The system of claim 10 wherein the first user preference includes a theme preference, a page size preference, or a view type preference.

20. A non-transitory computer readable medium comprising computer executable instructions embodied in the non-transitory computer readable medium that when executed by a processor of a computer perform steps comprising:

at a user device comprising at least one processor:

obtaining, using a first representational state transfer (REST) application programming interface (API) endpoint and a local data store for storing user preference data associated with a first user of a user preferences service, user preference data for a first cloud application, wherein obtaining the user preference data includes obtaining, from a remote server, a default value for a first user preference of the user preference data when the local data store lacks a value for the first user preference;

utilizing the user preference data to configure or present the first cloud application on the user device;

detecting an updated value for the first user preference; and storing, in the local data store, the updated value for the first user preference.

* * * * *